July 27, 1954
C. E. MORLEY
2,684,823
ADJUSTABLE SUPPORT
Filed July 28, 1948
2 Sheets-Sheet 1
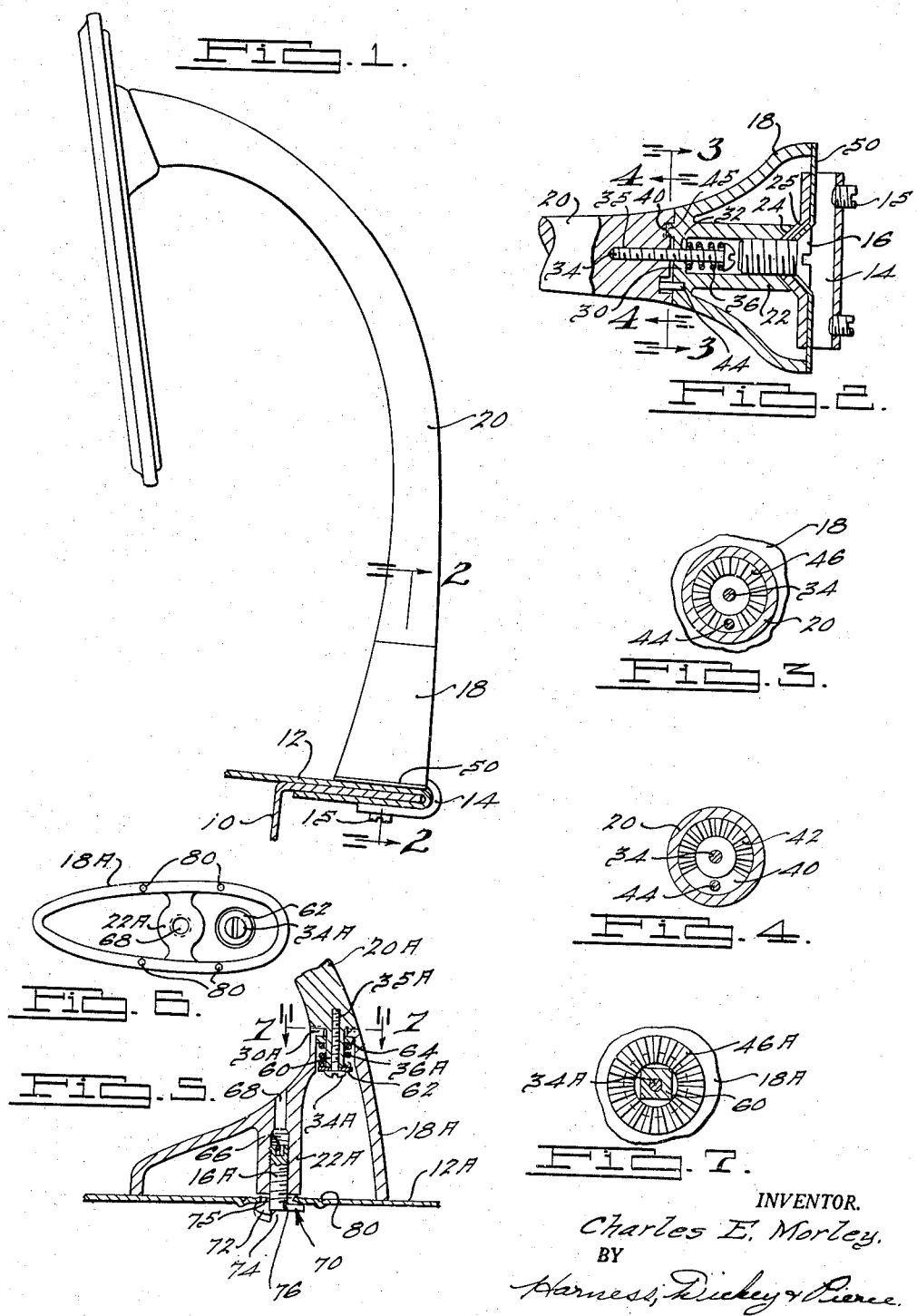
INVENTOR.
Charles E. Morley.
BY
Harness, Dickey & Pierce
ATTORNEYS.

July 27, 1954     C. E. MORLEY     2,684,823
ADJUSTABLE SUPPORT
Filed July 28, 1948     2 Sheets-Sheet 2
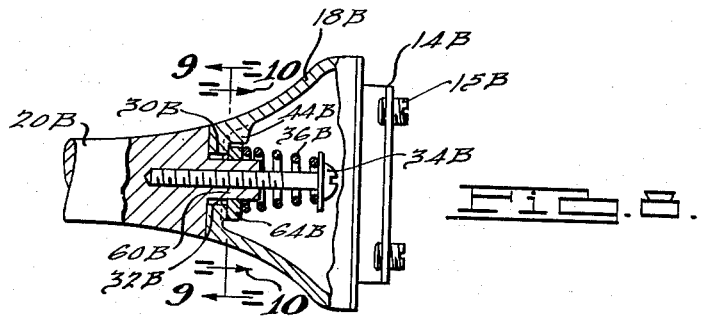
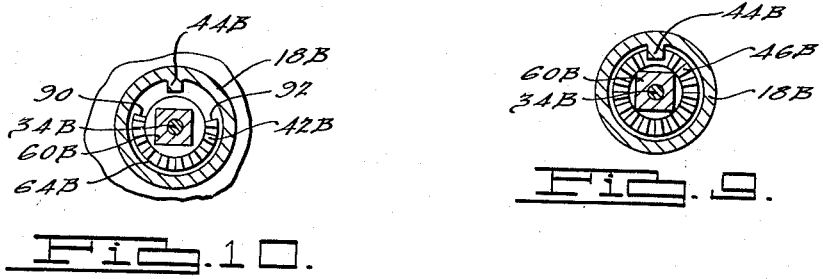
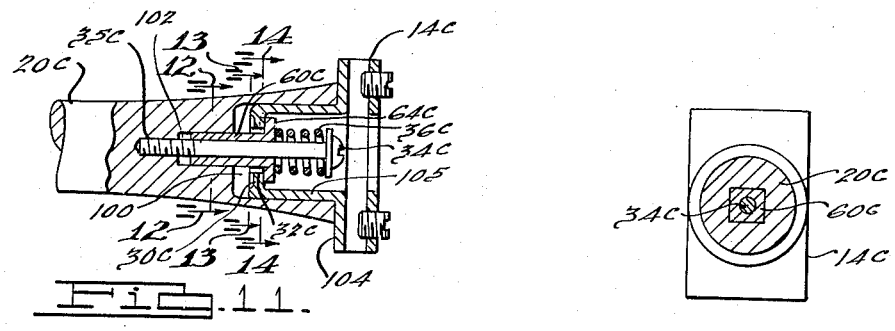
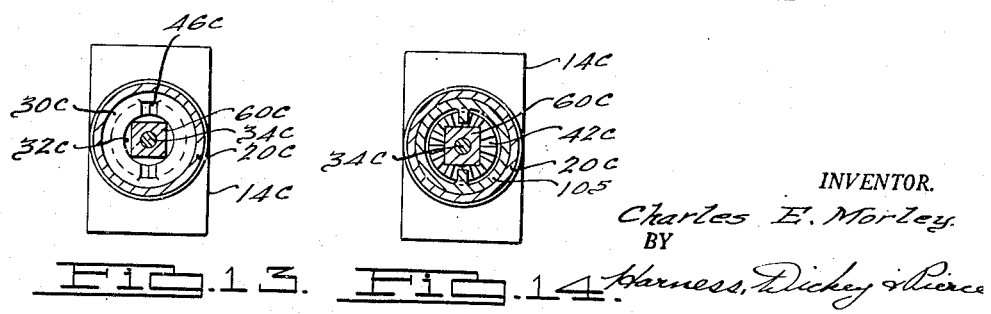
INVENTOR.
Charles E. Morley.
BY Harness, Dickey & Pierce
ATTORNEYS

UNITED STATES PATENT OFFICE 2,684,823

ADJUSTABLE SUPPORT

Charles E. Morley, Detroit, Mich.

Application July 28, 1948, Serial No. 41,121

1 Claim. (Cl. 248—226)

The present invention relates to adjustable supporting devices, particularly useful in connection with, although not exclusively restricted to, the supporting of externally mounted rear vision mirrors such as are commonly employed upon motor vehicles.

An important object of the invention is to provide improved adjustable supporting means of a character which affords a wide range of angular adjustment of a supported object such as a mirror, and which permits ready adjustment of such angular positioning without the use of tools, and all portions of the adjustable components of which are concealed from view within attractive and smoothly contoured supporting parts.

It is another object to provide improved adjustable supporting means of the indicated character which furnishes theft-proof support for an accessory device such as a rear view mirror, and which permits angular adjustment of the supported device about an axis substantially perpendicular to a vehicle body panel or equivalent support, both when the accessory mirror is in mounted position upon the vehicle body and when detached therefrom, yet which supports the mirror or other supported object in a very rigid and vibration-free manner.

Another important object of the present invention is to provide such an improved supporting structure incorporating a base section adapted to be fixedly attached to a motorcar body, an outer arm or extension portion carried by the base, and adjustable connecting means for rotatably mounting the outer arm section upon the base, which connecting means is housed at least partly in socket portions of the base which also serve to house and to coact with securing means for attaching the entire assembly to the vehicle body.

Other objects and advantages will become apparent upon consideration of the present invention in its entirety.

In the drawing:

Figure 1 is a top plan view of a rear view mirror construction provided with supporting means incorporating the principles of the present invention, corresponding to a horizontal sectional view of the front edge portion of a vehicle door, showing the mirror in installed position;

Fig. 2 is a sectional view taken substantially on the line 2—2 of Fig. 1 and looking in the direction of the arrows;

Figs. 3 and 4 are sectional elevational views taken substantially on the lines 3—3 and 4—4, respectively, of Fig. 2 and looking in the direction of the arrows;

Fig. 5 is a fragmentary longitudinal sectional view of a supporting structure incorporating the invention in modifieed form, showing the same installed upon a supporting panel;

Fig. 6 is a bottom plan view of the modified structure; and

Fig. 7 is a cross-sectional view taken substantially on the line 7—7 of Fig. 5 and looking in the direction of the arrows.

Fig. 8 is a view similar to Fig. 2 showing a modified construction;

Figs. 9 and 10 are cross-sectional views taken substantially on the lines 9—9 and 10—10 respectively at Fig. 8, and looking in the direction of the arrows;

Fig. 11 is a view similar to Fig. 2 showing another modification; and

Figs. 12, 13 and 14 are cross-sectional views taken substantially on the lines 12—12, 13—13 and 14—14 respectively of Fig. 11.

Referring now to the drawing, and particularly to Figs. 1 to 4 inclusive, the invention is shown incorporated in a rear view mirror construction adapted to be secured to and shown installed upon a liplike flange as 12 of the variety customarily provided around the margin of motor vehicle doors. In Fig. 1, the door construction is also shown fragmentarily in substantially horizontal section, generally designated 10.

The lip flange 12 is adapted to be embraced by a sheet metal clamp element of substantially U-section, designated 14. The part of the U-clamp which extends beneath the door flange is securable thereto by means of the set screws 15, while the portion of the clamp which extends over the outer face of the door is secured by a screw 16 to the base portion 18 of the mirror supporting arm structure.

The base portion 18 may be of hollow die cast construction, as best shown in Fig. 2, tapering to reduced proportions as it extends outwardly, the outer face of the arm being arranged to lie substantially parallel to the door surface to which the mirror is attached and being preferably of circular outline and adapted to smoothly conform externally with respect to the similarly contoured and dimensioned inner extremity of the outer arm section 20, secured to and projecting outwardly from the same in such manner as to appear as a smoothly flowing continuation thereof. The interior of the base portion 18 is hollow, and provided with a retroversey projecting tubular portion 22 integral therewith and extending from a point of juncture with the outer wall 30 of the base to a position such that it lies close to a surface or body to which the assembly is clamped by the U-clamp previously referred to. It will be seen that the inner end of the tubular portion 22 is open for the full internal diameter thereof, internally threaded, and provided with a partly conic countersunk portion 24 adapted to receive a centrally apertured and similarly contoured nipple-like embossment 25 formed upon the outer portion of the U-clamp 14. The screw 16 is projected through the aperture in the embossment 25 and into threaded engagement with the interior threads of the tubular portion 22 to secure the clamp to the base, as shown in Fig. 2. The outer wall 30 of the base is provided with a reduced axial aperture 32 through which the stem of a holding screw 34 may project from the interior of the base into a cooperatively threaded central hole 35 in the outer arm portion 20. It will be noted that the head of the screw 34 lies within the tubular socket portion 22 of the base. The screw 34 is preferably driven tightly into the threaded opening 35 in the outer arm so that it is in effect locked in place. A helical compression spring 36 is interposed between the head of the screw and the outer wall 30 of the base, the spring thus yieldably holding the outer arm portion 20 in position with respect to the base portion 18 of the arm and against separation and relative rotation.

The interengaging faces of the base and arm portions are provided with serrated detent portions which further yieldably oppose rotation of the arm portion 20 with respect to the base, but permit such rotation when the arm is positively rotatively actuated. In the preferred construction shown, the inner end of the arm is provided with a circular channel 40, the base of which is serrated radially as best shown at 42 in Fig. 4. A pin 44 fast in the arm projects into the channel in a direction parallel to the axis of rotation defined by the screw 34 and into the path of a segmental serrated portion 45 carried by the outer wall 30 of the base section 18 and projecting slidably and concentrically into the channel 40. The segmental serrated portion 45 is less than 360° in extent and adapted to interengage the serrated bottom portion 42 of channel 40. The extremities of such serrated portion 45 form abutments adapted to coact with the pin 44 to limit rotation of the arm 20, which may be turned about the axis of the screw 34, with the serrated portions frictionally passing over one another, until the pin 44 brings up against either end of the projecting serrated portion 45, as will be apparent.

It will be seen that the length of the tubular socket portion 22 is such that the inner face of the outer section of the U-clamp 14 may be positioned substantially flush with the inner edge of the base. Preferably, a protective plate as 50 of fibre or the like extends over such inner face of the U-clamp and the inner end of the base, and the protective plate may be held in place by the head of the screw 16, as shown, and serves to protect the surface to which the mirror is clamped against marring by the base structure when tightened in place.

In the modified construction shown in Figs. 5, 6 and 7, the base portion 18A and its attaching means are so constructed as to be adapted to be secured to the outer face of a panel whose inner face or back surface is inaccessible. Reference numeral 12A designates a sheet metal automobile body panel which typifies a suitable supporting panel. The base is attached to the panel by blind fastening means of a type disclosed in my co-pending application Serial No. 6,699 filed February 6, 1948, now abandoned. The nature of this type of fastening means is such that when the parts are tightened in place, the structure is not removable without actually tearing or damaging the vehicle body panel. It is now common practice to provide mirror supporting arm structures of this general class with outer arm sections rotatably adjustable about an axis substantially perpendicular to the vehicle body, but presently employed adjustable connecting means between the arm sections are of such character that it is necessary to manipulate the same from inside the base, with the assembly removed from the vehicle, in order to effect such rotary adjustment of the outer arm section with respect to the base section. Therefore, if through inadvertence or poor judgment, a mirror of the indicated irremovable variety is fastened to the side of a vehicle with the outer arm section turned to a wrong angular position, it is not possible to correctively adjust the angular relationship between the outer arm and the base after the accessory is installed, and in event of careless installation there is some danger that the mirror may be mounted upon the vehicle in a position such that the reflecting head of the mirror cannot be turned to a usable position. With the improved rotatably adjustable arm supporting means herein disclosed, however, it is not necessary to remove the base from the vehicle in order to adjust the angular position of the outer arm section, and such danger of uncorrectable improper installation is eliminated.

The outer arm section 20A of the embodiment of Figs. 5 and 6 is provided on its inner end with a relatively long stemlike boss projecting substantially centrally from and perpendicularly with respect to the circular inner end of the arm. The boss 60 is of square cross section externally, and a central threaded hole extends longitudinally therethrough and into the inner end of the arm portion 20A, as indicated at 35A. A screw 34A is threadedly secured in the hole 35A and retains in position upon the outer end of the boss 60 a washer 62 serving as an outer abutment for a helical compression spring 36A. The hole 32A in the base through which the boss 60 projects is preferably circular and large enough to permit free rotation of the boss therein. At its outer end the spring reacts against an abutment washer 64 which is formed with a squared central opening fitted nonrotatably upon the boss 60. Washer 64 is slidable upon the boss 60, however, and bears against the inner surface of the weblike outer wall 30A of the base, so that the spring, reacting through the washer 62 and screw 34A, draws the arm 20A against the correspondingly contoured outer end of the base, yieldably retaining the arm against rotation and displacement. Radial serrations as 46A may also be formed upon the engaging faces of the base and arm to further yieldably oppose relative rotation of the arm. It will be apparent that when the arm is turned, such serrated portions frictionally slide past one another to permit angular adjustment in response to the application of sufficient turning force to the outer arm section. During such rotation of the outer arm, both of the washers 62, 64 turn therewith, as does the spring 36A, so that no torque is applied to the screw 34A tending to loosen or tighten the same, and danger of unwanted loosening of the screw as a result of adjustment of the arm is accordingly eliminated. In the embodiment of Figs. 5 and 6, full 360° rotary adjustment is permitted, and it will be observed that this entails no danger of unwanted loosening of the retaining screw 34A, by virtue of the aforementioned arrangement of the abutment washers 62, 64A in such manner as to turn with the arm and thereby prevent the application of torque to the screw through the spring.

The blind fastening means for securing the base structure to a body panel as 12A comprises a special screw device having a threaded stem portion 16A threadedly fitted in the correspondingly threaded socket portion 22A which opens at the bottom of the base, from which the threaded stem of the screw projects. A tool receiving socket 66 is formed in the end of the screw 16A which lies within the threaded hole in socket 22A, and a reduced access opening 68 is formed in the outer wall of the base as an axial extension of the screw hole in the socket 22A. An Allen wrench or other appropriate tool may be inserted through access opening 68 to turn the screw. The opposite extremity of the screw projects from the socket portion 22A and is adapted to extend through a panel as 12A to which the mirror is to be secured. Such outer extremity of the stem of the screw carries a special head of substantially circular platelike form, generally designated 70, having a guiding lip 72 bent outwardly to generally helical form and separated radially by means of a slot 74 from the remaining portions of the head. By virtue of the helical form of the head and the radial slot 74, such head may be threaded through an opening as 75 in the supporting panel which is of lesser diameter than the maximum diameter of the head portion 70, so that such head portion may overengage the rear face of the panel 12A and prevent separation of the supported mirror structure therefrom. After such head portion is so inserted through the opening 75, which is done with the screw so positioned that the head structure 70 is spaced substantially from the inner face of the base, such head portion is tightened against the rear face of the panel 12A by means of an Allen wrench inserted through the opening 68. With the stem portion 16A provided with conventional right-hand threading, such tightening of the head portion 70 against the rear face of the panel is affected by counter-clockwise rotation of the stem, as will be appreciated. When the head 70 is so drawn against the inner face of the body by rotation of the same in a direction to pull it back toward the base, an inclined locking tooth 76 formed upon the opposite side of the slot 74 from the guiding lip 72 and extending substantially radially of the head is dragged over the metal of the panel, by virtue of the fact that the tooth is inclined rearwardly or back toward the base, when considered in the direction of tightening rotation. The tooth thus tends to bite into the metal of the supporting panel 12A and prevents reverse rotation of the head and stem in a direction to loosen the same. The holding means is thus effectively locked against loosening, since any attempt to turn the screw and head in a reverse direction to move the head away from the panel 12A causes the toothed portion 76 to bite into the metal.

A plurality of short, sharply pointed projections as 80 are formed upon the bottom of the base 18A, preferably being positioned relatively close to the holding screw socket portion 22A. When the holding screw is tightened, the points 80 are driven into the metal of the panel 12A and serve to lock the base structure against rotation about the axis of the screw 16A.

A further modification is shown in Figs. 8 to 10 inclusive, wherein the inner end of the arm 20B carries a centrally projecting stem portion 60B of square or other suitable noncircular cross section which projects rotatably through a circular hole 32B in the outer end wall 30B of the base 18B. The base may be of hollow form, as shown, and fabricated by die-casting or other suitable process, and provided with suitable means for securing the same to the car body, indicated as a clamp 14B of U-section and set screws 15B, by means of which the clamp and thereby the support assembly is adapted to be secured to the lip of a door.

In this embodiment, the abutting faces of the arm and base are smooth, and the inner surface of the end wall 30B of the base is provided with serrate radial teeth 46B. An integral stop lug portion 44B also extends substantially radially inwardly from the inner wall of the hollow base toward the stem portion 60B. A combined spring abutment washer and detent member or plate 64B is slidably but nonrotatably fitted upon the stem 60B within the base. Plate 64B is provided with serrate teeth 42B extending less than 360°, as best shown in Fig. 10, and the toothed surface thereof is urged against the similarly toothed surface 46B by the spring 36B. The spring is retained, as in the previous embodiment, by the enlarged head portion of the screw 34B. It will also be noted that the segmental serrated portion 42B is of greater radius than the remaining portions of the plate 64B, thereby providing abutments as 90, 92 at the extremities of such serrated toothed section. Such abutments are adapted to bring up against opposite sides of the lug 44B as the extremes of rotary adjustment of the arm with respect to the base are reached.

It will be noted that this modification permits the convenient formation of an integral stop for limiting the angular rotation of the arm and requires no more parts than the embodiment last described, while in addition the exposed surfaces and the abutting ends of the arm and the base which bear against one another are of smooth configuration. Extreme accuracy is accordingly not required in order to fit the parts with such closeness that they present a smooth unbroken appearance, when viewed from a slight distance. In addition, it will be appreciated that projecting external parts require more careful handling during the buffing operations unsually involved in the application of a smooth plated or ornamental finish, and the internal mounting of the irregularly contoured teeth and other parts made possible by this modification accordingly possesses important manufacturing advantages.

The further modification depicted in Figs. 11 to 14 is adapted to incorporate a one-piece stamped sheet metal base structure integral with the supporting clamp and which is of less massive appearance but more economical construction. A one-piece or unitary clamp and base of this general character is commonly used where a less expensive construction is desired, although as usually constructed, the base consists of a simple sheet metal clip, bent to U-section, with the inner end of the arm simply fastened to the outer face of the clip. In my improved construction, the arm 20C is provided at its inner end with a double counterbored opening having its largest portion forming an enlarged cylindrical socket 100, an intermediate central section 102 of reduced noncircular form, which may be square, as shown, and the further threaded smallest or inner section 35C adapted to receive the threaded end of the screw 34C.

The U-clamp is generally designated 14C. Its outer wall 104 is provided with an outwardly embossed portion 105 of substantially cylindrical section upon which the socketed portion of the arm is rotatably fitted, such socketed portion being deep enough, as shown, so that the arm may be fitted entirely over the projecting boss 105, with the inner end of the arm bearing snugly against the outer face of the clamp.

The end wall 30C of boss 105 is centrally pierced, as indicated at 32C, and the inner face of the end wall surrounding the opening 32C is formed with radial detent lugs 46C projecting downwardly therefrom, two such lugs being shown in the preferred construction illustrated. It will be appreciated that these may be formed during the stamping of the base.

The hole 32C in the base is circular and large enough to rotatably receive a noncircular stem element 60C which is formed separately from the arm but keyed thereto to rotate therewith. The stem may also be of die-cast construction, and includes the square stem section (to which the reference numeral 60C is applied) which conforms in cross section to, and is slidably fitted in, the opening 102, and a head portion 64C integral with the stem and extending outwardly radially in back of the outer wall 30C of the base, to extend over the portion of the interior of such wall which carries the detent lugs 46C. The underside of the head 64C is provided with radial teeth 42C adapted to coact with the lugs 46C, as in the embodiments previously described. These parts act as detent means resiliently opposing the adjustment of the arm and tending to maintain any adjusted position thereof.

It will be noted that in this embodiment the stem assembly 60C, spring 36C, and screw 34C all rotate as a unit with the arm 20C so that there is no tendency to loosen the screw. No stop need be provided to limit the rotation of the arm. It will be noted that economical assembly of the construction depicted in Figs. 11 to 14 is facilitated by the fact that the stem 60C and spring 36C may be preassembled upon the screw 34C prior to the insertion of any of these parts in the base, so that all of these parts can be inserted in the base at once in preassembled condition, and the screw thereafter tightened in place, in a single motion or operation. This effects an important reduction in the cost of assembly, which is directly reflected in a saving in cost of manufacture.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claim.

I claim:

A supporting structure for an accessory rear view mirror device or the like comprising a base having an inner face adapted to lie against a vehicle body and having an outer face, said base having an opening of substantially axial length extending therethrough in a direction substantially perpendicular to the outer face and terminating in a position accessible from the inner face, said opening being of stepped diameter with a portion of smaller diameter near said outer face and a portion of larger diameter near said inner face, a first screw for securing an extension arm to said base and against said outer face, said first screw insertable in and removable through the inner face and extending through said opening portion of smaller diameter, a second screw axially spaced from said first screw, said second screw being of larger diameter than said first screw and extending into said opening portion of larger diameter, said second screw also insertable in and removable through said inner face, and a clamping element having a relatively flat portion extending substantially parallel to said inner face and provided with an aperture therein aligned with said opening, said second screw extending through said aperture and securing said clamping element to said base.

References Cited in the file of this patent

UNITED STATES PATENTS

| Number | Name | Date |
|---|---|---|
| 1,932,697 | Jankovic | Oct. 31, 1933 |
| 2,248,833 | Thibault et al. | July 8, 1941 |
| 2,293,303 | Morley | Aug. 18, 1942 |
| 2,322,431 | Fischer | June 22, 1943 |
| 2,338,780 | Poncher et al. | Jan. 11, 1944 |
| 2,447,786 | Anderson | Aug. 24, 1948 |
| 2,455,919 | Daon | Dec. 14, 1948 |